C. F. ROBINSON.
METHOD FOR THE MANUFACTURE OF HIGH SPEED CIRCULAR FRICTION SAWS.
APPLICATION FILED DEC. 3, 1914.
1,177,057.
Patented Mar. 28, 1916.
2 SHEETS—SHEET 1.
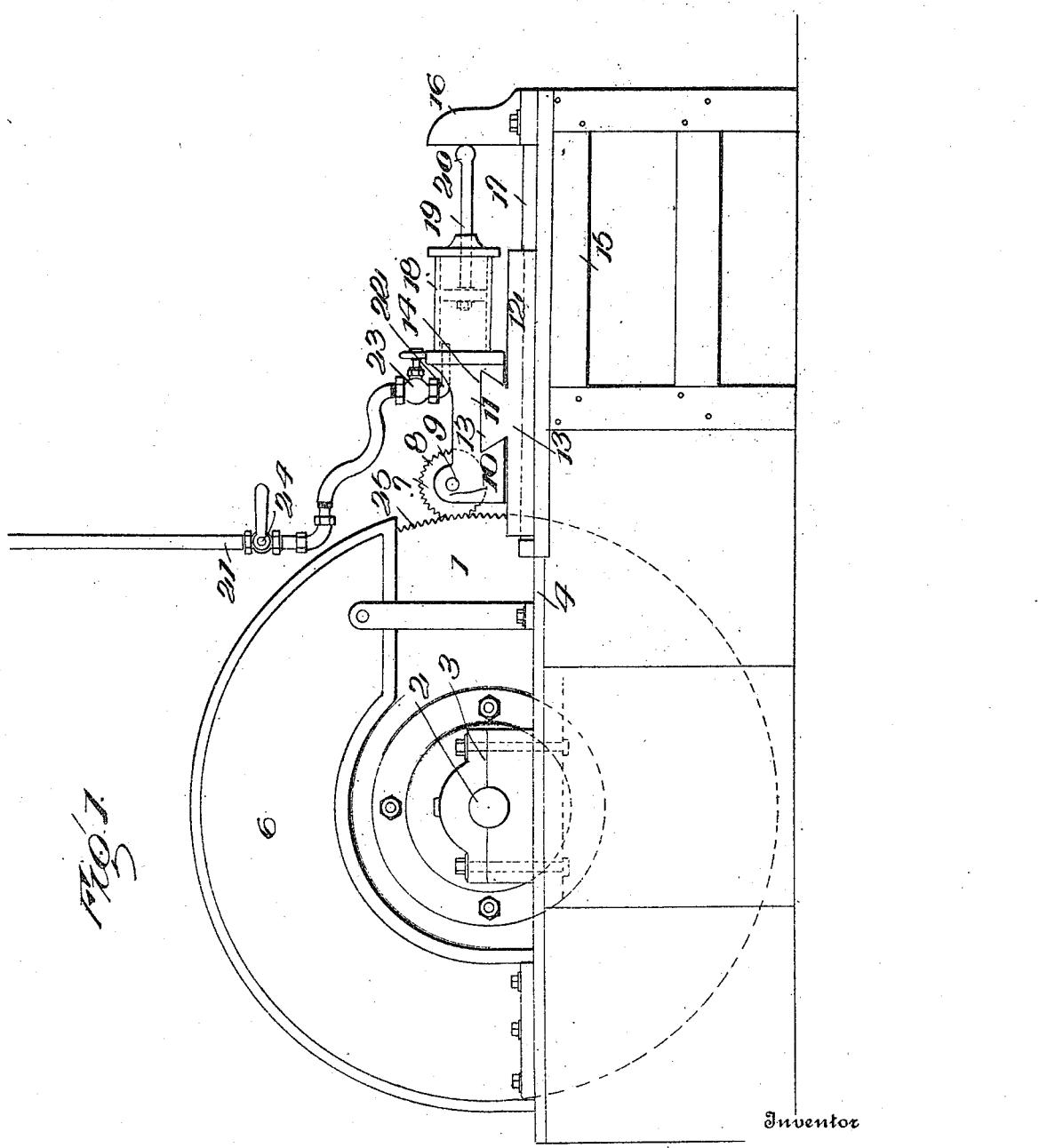

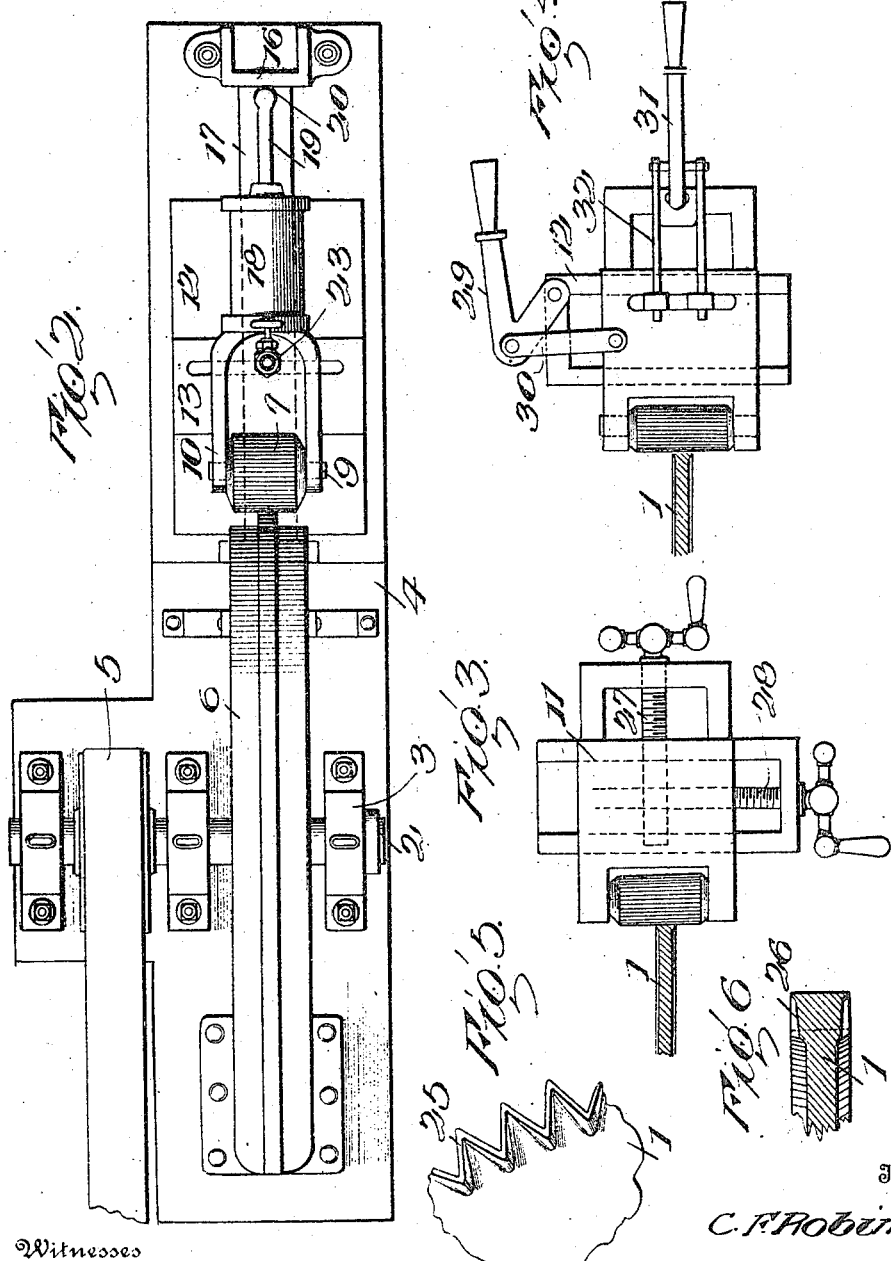

UNITED STATES PATENT OFFICE.

CHARLES F. ROBINSON, OF SAN FRANCISCO, CALIFORNIA.

METHOD FOR THE MANUFACTURE OF HIGH-SPEED CIRCULAR FRICTION-SAWS.

1,177,057.    Specification of Letters Patent.    Patented Mar. 28, 1916.

Application filed December 3, 1914. Serial No. 875,324.

*To all whom it may concern:*

Be it known that I, CHARLES F. ROBINSON, a citizen of the United States, residing at San Francisco, in the county of San Francisco and State of California, have invented certain new and useful Improvements in Methods for the Manufacture of High-Speed Circular Friction-Saws, of which the following is a specification.

This invention aims to disclose a novel method of manufacturing high speed friction circular saws, such as are employed in the cutting of metal, and also aims to provide a highly efficient machine for use in carrying out the method.

Originally the high speed friction circular saws were toothless, dependence being placed entirely upon the capabilities of their smooth peripheral surfaces wearing away by friction any metal presented to the saw. Such a saw presented the disadvantage, however, that the metal could not be quickly cut thereby, and, furthermore, due to the abrading action of the work upon the saw, the life of the saw was comparatively short. Efforts were made to overcome the disadvantages presented by a smooth edged saw by cutting small notches or nicks in the peripheral surface of the saw, by the use of a chisel, this however did not give satisfactory results for the notches were of unequal depth and frequently the chisel would produce a small fracture in the saw, which would of course in time result in the bursting of the saw.

The present invention therefore aims to provide for the formation of teeth in the peripheral surface of the saw disk of uniform size and shape and without likelihood of fracturing the saw.

In the accompanying drawings: Figure 1 is a side elevation of the machine employed in carrying out the present invention. Fig. 2 is a top plan view thereof. Fig. 3 is a top plan view, illustrating a slight modification of the invention. Fig. 4 is a view similar to Fig. 3, illustrating another modification. Fig. 5 is a detail fragmentary side elevation of a portion of the saw disk. Fig. 6 is a transverse sectional view through a portion of the saw disk.

Corresponding and like parts are referred to in the following description and indicated in all the views of the accompanying drawings by the same reference characters.

In carrying out the method of the present invention, a saw disk blank is rotated by any suitable means, and during its rotative movement a toothed roller is held under a high degree of pressure against the peripheral surface of the saw disk blank, the roller being rotated by the said disk. During this operation the saw disk blank is not subjected to heat, but, on the other hand, is by any suitable means kept at a low degree of temperature. As a consequence, the teeth are formed by the pressing of the teeth upon the roller into the peripheral surface of the saw disk blank, the metal of the disk being pressed laterally as well as inwardly, so that in the finished article, the teeth will be of a width greater than the thickness of the body portion of the disk.

In the drawings, the saw disk is indicated in general by the numeral 1 and is temporarily fixed upon a shaft or spindle 2, mounted in suitable bearings 3, upon a frame 4. Any suitable means, as for example, a belt and pulley 5 may be provided for imparting rotary movement to the spindle 2, and in order to guard against accidents a suitable shield or guard 6 is preferably mounted upon the frame 4 and extends over or covers nearly the entire upper portion of the saw disk.

As before stated, the teeth are cut in the periphery of the saw disk by means of a toothed roller, and in the drawings, this roller is indicated by the numeral 7 and its teeth by the numeral 8. It will be observed that the roller is of a diameter considerably less than that of the saw disk in the periphery of which the teeth are to be cut, and that the said roller is of a length considerably greater than the thickness of the saw disk, so that when one portion of the roller becomes worn or its effectiveness is otherwise impaired, a new portion of the surface of the roller may be brought into coöperative relation to the saw disk. This roller 7 is mounted upon a suitable spindle 9 or it may be provided with trunnions at its ends, and this spindle or trunnions, as the case may be, is rotatably mounted in suitable bearings 10 upon a head 11.

The numeral 12 indicates a bed upon which the head 11 is adjustably mounted, the bed being provided with a dove-tailed boss 13 and the head being formed with a transverse dove-tailed groove 14, the walls of which fit the boss. It will be apparent that the head is in this manner firmly supported and that it may be adjusted transversely of the bed 12. The bed 12 is mounted upon a suitable frame 15 provided with an abutment 16 and with a guide 17 which extends longitudinally of the top of the frame and forwardly from the abutment. The bed 12 is provided in its under side with a groove fitting the said guide 17 and by reason of this construction, the bed 12 is held against lateral displacement but is mounted for movement toward and from the saw disk 1. It will now be apparent that the head 11 is supported for adjustment in the direction of the saw disk 1 and transversely of the peripheral surface thereof. In order that the roller 7, which is mounted upon the head 11, may be caused to bear firmly against the peripheral surface of the saw disk, a cylinder 18 is mounted upon the rear end of the head 11 and a piston 19 is mounted to work within the said cylinder. The stem of the piston 19 is provided with a spherical head 20 which bears against the forward face of the abutment 16, and the purpose of this construction will be presently explained.

The numeral 21 indicates a pipe leading from any suitable source of fluid under pressure and this pipe is connected in any suitable manner with an inlet pipe 22 for the forward end of the cylinder 18. A cut-off valve 24 is interposed in the supply pipe as also a throttle valve 23. As before stated, the disk 7 is provided with teeth upon its circumferential surface and these teeth extend longitudinally of the said surface and parallel to the axis of the roller.

In the operation of the machine, the saw disk 1 is set in motion, it being initially of course in blank form, or, in other words, having a smooth peripheral surface. The head 11 having been adjusted to bring an effective portion of the toothed portion of the roller 7 opposite the periphery of the saw disk blank, the throttle valve 23 is opened. The fluid under pressure from the pipe 21 entering the forward end of the cylinder 18 and exerting a force against the head of the piston, which force is resisted by the thrust of the piston rod against the abutment 16, the said cylinder and the head 11 connected therewith will be moved in the direction of the saw disk blank. The saw disk blank will of course impart rotary motion to the toothed roller 7 and, as the periphery of the said disk blank travels against the toothed periphery of the said roller 7, the teeth upon the roller will be forced into the material of the blank, crowding the material inwardly and laterally. Inasmuch as no means is provided for preventing lateral crowding of the material of the saw disk blank, the teeth formed on the periphery of the blank will be of a width greater than the thickness of the body portion of the disk, so that when the saw is put into use, the peculiar formation of its toothed periphery will afford clearance for that portion of the saw inwardly of the teeth, and the cutting operation may be accomplished rapidly and effectually and without danger of the saw becoming highly heated. The character of the teeth formed in the periphery of the saw disk is shown clearly in Figs. 5 and 6 of the drawings, in which figures, the teeth are indicated by the numeral 25 and their projecting or laterally extending sides are indicated by the numeral 26.

While I prefer to use fluid under pressure for the purpose of holding the toothed roller firmly against the periphery of the saw disk blank, I may make use of the structure, shown in Figs. 3 and 4 of the drawings, or, in fact, of any other suitable means for accomplishing this result and for accomplishing the lateral adjustment of the head 11. In Fig. 3 a hand screw 27 is provided for adjusting the head 11 in the direction of the periphery of the saw disk blank, and a second hand screw 28 is provided for the purpose of adjusting the head 11 laterally, so that new portions of the toothed cutting roller may be brought into position opposite the periphery of the said disk blank. In the structure shown in Fig. 4, a lever 29 is mounted upon the bed 12 and connected by means of a link 30 to the head 11, and a lever 31 is also mounted upon the bed and connected by means of links 32 with the said head 11. By manipulating the lever 29, the head 11 may be adjusted transversely of the bed 12 and by manipulating the lever 31 the head 11 may be forced in the direction of the saw disk blank so as to cause the toothed roller to bear firmly against the periphery thereof.

It will of course be understood that the machine embodying the present invention may be used for resetting and resharpening the teeth of high speed friction saws equally as well as it may be employed for the initial cutting or formation of the said teeth.

Having thus described the invention, what is claimed as new is:

1. That method of producing high speed friction circular saws which includes the step of rotating a saw disk blank in peripheral contact with a toothed roller, in the absence of heat and under pressure.

2. That method of producing high speed friction circular saws which includes the step of rotating a saw disk blank in peripheral contact with a toothed roller without the employment of any means for laterally compressing the peripheral portion of the blank, whereby the material of the blank will be crowded inwardly and laterally to form teeth of a width greater than the thickness of the blank.

3. That method of producing high speed friction circular saws which includes the step of rotating a disk blank in peripheral contact with a toothed roller, the sides of the blank at and adjacent the periphery thereof being free from lateral obstruction throughout the entire circumference of the blank whereby to permit of lateral as well as inward crowding of the material of the blank at the periphery thereof when acted upon by the said toothed roller.

In testimony whereof I affix my signature in presence of two witnesses.

CHARLES F. ROBINSON. [L. S.]

Witnesses:
   MARY F. HUEY,
   H. J. LINN.